United States Patent [19]

Hansen et al.

[11] Patent Number: 4,614,329
[45] Date of Patent: Sep. 30, 1986

[54] COCK OR VALVE COMPRISING A GEAR WHEEL TRANSMISSION

[75] Inventors: Anders Hansen, Husby; Bjarne Jepsen, Assens, both of Denmark

[73] Assignee: Broen Armatur A/S, Assens, Denmark

[21] Appl. No.: 662,428
[22] PCT Filed: Jan. 31, 1984
[86] PCT No.: PCT/DK84/00008
§ 371 Date: Sep. 28, 1984
§ 102(e) Date: Sep. 28, 1984
[87] PCT Pub. No.: WO84/02966
PCT Pub. Date: Aug. 2, 1984

[30] Foreign Application Priority Data

Jan. 31, 1983 [DK] Denmark ................ 377/83

[51] Int. Cl.⁴ ........................................ F16K 31/54
[52] U.S. Cl. ............................. 251/248; 251/249.5
[58] Field of Search ............ 251/248, 249.5, 250, 251/205, 268, 288, 297, 367; 74/498, 500, 552, 553; 137/315

[56] References Cited

U.S. PATENT DOCUMENTS

| | | | |
|---|---|---|---|
| 1,055,117 | 3/1913 | Woodworth | 251/248 |
| 1,456,697 | 5/1923 | Kitts, Jr. | 251/249.5 |
| 1,924,886 | 8/1933 | Semon | 251/248 |
| 1,951,121 | 3/1934 | Babcock | 251/248 |
| 1,969,375 | 8/1934 | Laurent | 251/248 |
| 3,026,741 | 3/1962 | Schaverien | 251/249.5 |
| 3,679,170 | 7/1972 | Bernas et al. | 251/297 |
| 3,744,752 | 7/1973 | Massey | 251/288 |
| 3,776,507 | 12/1973 | Tomlin et al. | 251/248 |
| 4,093,180 | 6/1978 | Strabala | 251/288 |
| 4,141,538 | 2/1979 | Bake et al. | 251/367 |
| 4,230,300 | 10/1980 | Wiltse | 251/268 |

FOREIGN PATENT DOCUMENTS

| | | |
|---|---|---|
| 322310 | 5/1975 | Austria . |
| 959816 | 12/1974 | Canada . |
| 141776 | 3/1978 | Denmark . |
| 2238269 | 6/1973 | Fed. Rep. of Germany . |
| 2165379 | 8/1973 | France . |
| 48-66234 | 6/1973 | Japan . |
| 7211590 | 6/1973 | Netherlands . |
| 1403605 | 8/1975 | United Kingdom . |

Primary Examiner—George L. Walton
Attorney, Agent, or Firm—Watson, Cole, Grindle & Watson

[57] ABSTRACT

A cock has a handle (17) for rotating the cock plug (3) by means of a stem (5), and between the handle (17) and the stem (5) a gear transmission (22,37) is arranged. One part of the gear transmission consists of a gear wheel (22) centrally secured in the handle, and the handle (17) is shaped as a part of the housing which together with a housing element (8) form a cavity (21) wherein the gear transmission (22,37) is arranged. The housing element (8) is non-rotatably connected with the housing (1) of the cock. In order to obtain a simple and compact gear transmission the handle (17) is arranged with each central axis (26) displaced parallel to the axis (6) of the stem (5), and moreover the stem (5) is non-rotatably connected with a gear wheel sector (24) at the axis (25) of the sector. Furthermore, the teeth (37) of the gear wheel sector (24) engage with the teeth of the gear wheel (22) on the handle (17).

6 Claims, 4 Drawing Figures

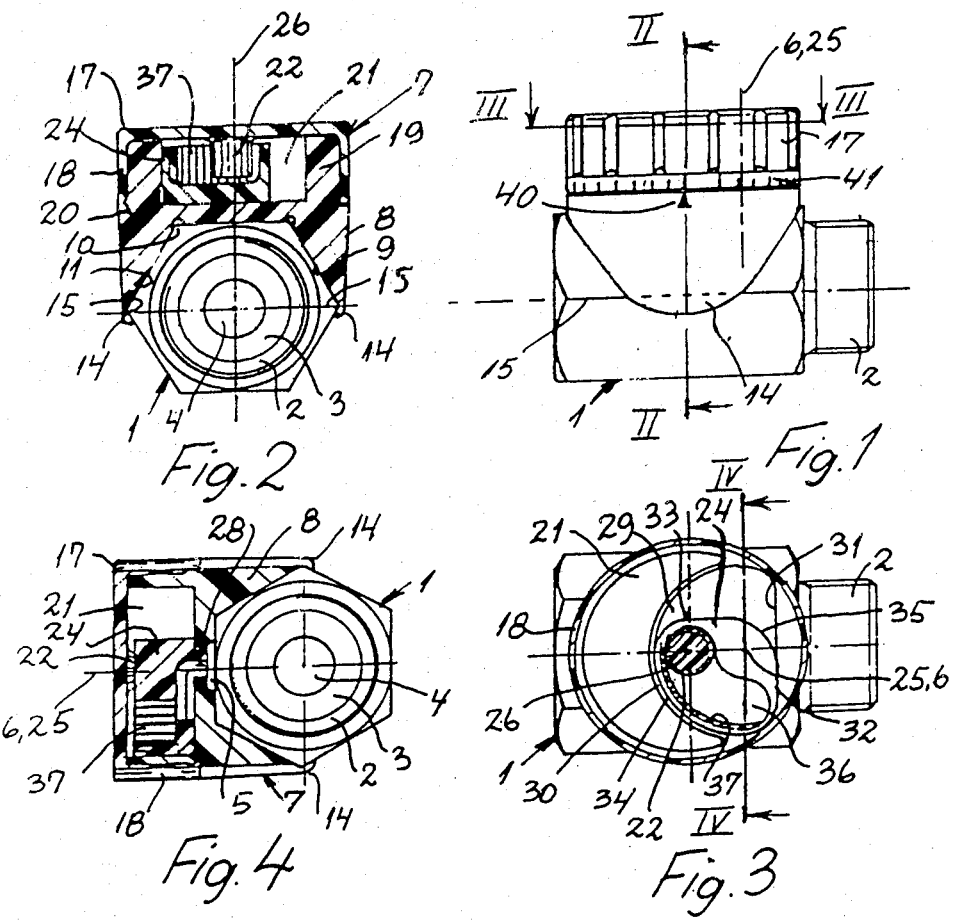

COCK OR VALVE COMPRISING A GEAR WHEEL TRANSMISSION

BACKGROUND OF THE INVENTION

1. Field of the Invention

The present invention relates to a cock or valve comprising a handle for rotating the plug of the cock or the valve body by means of a stem, and wherein a gear transmission is provided between the handle and the stem, one part of the gear transmission being constituted by an internal and centrally in the handle secured gear wheel, and wherein the handle is formed as a part of a housing which together with a housing element, which is non-rotatably connected with the housing of the valve or cock, form a cavity wherein the gear transmission is arranged 2. Prior Art A cock or valve of the kind referred to above is disclosed and explained in the applicant's prior Danish patent application filed Mar. 30, 1978, sub application No. 1417/78, with the title "Valve or cock comprising a gear wheel transmission", the documents of this application having been made available to the public on Sept. 30, 1979. According to the valve or cock disclosed in the noted application, the gear wheel transmission is constituted by a planet gear comprising four planet wheels arranged upon a planet wheel support, and which engage with an internal toothed rim in the housing element which is secured to the valve or cock housing. The gear wheel centrally arranged in the handle serves as sun wheel for the planet wheels and the planet wheel support is coupled to the stem of the cock plug or the valve body.

SUMMARY OF THE INVENTION

The cock or valve according to the present invention is characterized in that the handle is positioned with the central axis of the handle displaced parallel to the axis of the stem, the stem moreover being non-rotatably connected with a gear wheel sector at the axis of the gear wheel sector, the teeth of the gear wheel sector moreover engaging with the teeth of the gear wheel of the handle. By means of this structure a very simple gear wheel transmission is achieved because for such transmission only the gear wheel of the handle and the gear wheel sector are needed and the parallel displacement of the axis of the handle with respect to the axis of the stem simultaneously offers a high leverage which, in connection with the fact that a high moment of force may be applied to the gear wheel of the handle due to the central positioning thereof, results in that it is only necessary to apply a small force to the handle in order to rotate the cock plug or the valve body. Simultaneously, the gear transmission may be constructed very compact in such a way that only minimal requirements must be fulfilled in order to accomodate the gear transmission and, accordingly, the handle and the housing element may be constructed with corresponding small dimensions, whereby it is achieved that the cock or valve according to the present invention may be produced with small dimensions and may be given an appealing appearance.

An embodiment of the cock or valve is according to the invention characterized in that the teeth of the gear wheel sector face inwardly towards the axis of the gear wheel sector. By means of this embodiment it is achieved that the handle obtains the same direction of rotation as the stem, and accordingly also as the cock plug or valve body, whereby a high degree of security against false manoeuvring of the cock or valve is achieved.

A further embodiment of the cock or valve is according to the invention characterized in that the teeth of the gear wheel sector extend along an arch of a circle of approximately 90°, that the gear wheel of the handle is provided with teeth along the full circumference and that the number of teeth of the gear wheel of the handle generally corresponds to the number of teeth of the gear wheel sector. This embodiment is of particular importance in connection with cocks or valves wherein only a rotation of 90° of the cock plug or valve body is necessary because this embodiment results in that a full rotation of the handle will correspond to a quarter of a revolution of the cock plug or the valve body.

A further embodiment of the cock or valve is according to the invention characterized in that the gear wheel sector is accomodated in a recess in the housing element secured to the housing of the valve or cock, the recess being enclosed by a wall shaped generally as a part of an arc of a circle and by a wall part extending generally as a chord to the arc circle, the chord extending generally perpendicular to an imaginary line extending through the axis of the stem and the axis of rotation of the gear wheel sector, the gear wheel sector being delimited by two generally perpendicular to each other extending edges and by two circle arc shaped edges extending coaxially with the axis of the gear wheel sector and connecting the perpendicular to each other extending side edges of the sector with each other, the curvature of one of the circle arc shaped edges corresponding to the curvature of the inner surface of the circle arc shaped wall and the radius of the curvature of the other circle arc shaped edge generally corresponding to the distance between the axis of the sector and the wall part extending as a chord. By means of this embodiment a safety guiding of the gear wheel sector is achieved, and also effective end stops for the gear wheel sector is achieved due to abutment between the generally perpendicular to each other extending side edges of the sector and the wall part extending as a chord.

A further embodiment of the cock or valve according to the invention is characterized in that the teeth of the gear sector constitute the outer delimitation of a curved groove or a curved hole in the gear wheel sector, the groove or hole extending along an arc of a circle of generally 90°, the groove or hole being at the ends delimited by two generally half circular walls and having a width which is a little greater than the diameter of the gear wheel of the handle. This embodiment also offers an effective guiding of the sector because the sector will be guided with respect to the gear wheel of the handle by means of the curved groove or the curved hole and the ends of such groove or hole may form end stops for the gear wheel sector.

A still further embodiment of the cock or valve according to the invention is characterized in that the non-rotatable connection between the gear wheel sector and the stem consists of an edged pin secured to the sector and engaging a correspondingly shaped hole in the stem. Such coupling is simple and reliable and may easily be provided by a simple insertion of the pin into the hole.

A still further embodiment of the cock or valve according to the invention is characterized in that the housing element non-rotatably connected with the cock or valve housing constitutes a separate housing element which by means of snap action is connected with the cock or valve housing. By means of this embodiment it is achieved that such housing element with gear transmission and handle easily may be mounted upon existing valves or cocks. In cases where the cock or valve housing has hexagonal cross section, the surface of the housing element facing away from the handle may according to a still further embodiment of the cock or valve according to the invention have a shape which is complementary to three of the side surfaces of the cock or valve housing,and said side of the housing element may at its opposite side edges have towards each other facing edge portions for gripping two diametrical edges of the valve or cock housing.

According to a still further embodiment of the cock or valve according to the invention the handle appropriately engages the outer surface of the housing element by means of a groove-bead connection provided by snap action. By means of this embodiment an easy assembling of the handle and the housing element is achieved which simultaneously allows rotation thereof,and which prevents dirt and impurities from penetrating into the gear transmission.

DESCRIPTION OF THE DRAWINGS

The invention will hereinafter be further explained with reference to the drawings, wherein FIG. 1 shows a side view of an embodiment of a cock or a valve according to the invention, viz. in the form of a ball valve, FIG. 2 shows the ball valve illustrated in FIG. 1 as seen from the right hand side of FIG. 1, wherein however an addition, wherein a gear transmission is arranged, is shown in section according to line II—II, FIG. 3 shows a section according to line III—III in FIG. 1, and FIG. 4 shows a section according to line IV—IV in FIG. 3.

DETAILED DESCRIPTION OF THE PREFERRED EMBODIMENTS

On the drawing, 1 is the housing of the ball valve illustrated. The housing consists of hexagonal material and is at one end provided with a nipple 2 and has at the other end internal threads for inserting the valve in a water distributing system. As it appears from FIGS. 2 and 4, a spherical plug 3 is arranged in the housing 1 and has a passage 4, and accordingly it will from FIGS. 2 and 4 be understood that the valve is shown in open position. The plug 3 is connected with a stem, the outer end of which projects a little with respect to the side surface of the housing 1 which faces to the left in FIG. 4, as indicated at 5. The stem is provided with an axially arranged hole having edged cross section for engagement with a correspondingly shaped tool. Furthermore, the end of the stem 5 may be provided with a groove in such a way that rotation may also be carried out by means of a screw driver. The spherical valve plug 3 is rotatable about an axis 6 shown in FIG. 1, and accordingly the stem 5 extends coaxially with the axis 6. The plug itself is arranged rotatably about this axis 6 inside the housing in a way known per se, viz. between suitable sealings.

The ball valve referred to above is of a construction known per se, and accordingly does not need any further explanations here.

On the housing 1 an addition is arranged which generally is designated 7. The addition consists of a housing element 8 which is non-rotatably connected with the valve housing 1, due to the fact that the side of the housing element 8 facing towards the valve housing 1 has a shape which is complementary to one half of the shape of the housing 1, and accordingly in such a way that the housing element 8 has three surfaces 9, 10 and 11 resting against the corresponding side surfaces of the housing 1. The opposite side parts of the housing element 8 have at their ends small inwardly extending projections 14, which just grip around the corresponding edges 15 of the valve housing 1.

Even though an embodiment is illustrated on the drawing, wherein the housing element 8 constitutes an addition it should be stressed that such addition may be constructed integrally with the housing 1 which furthermore also may have another shape than the one illustrated.

On the housing element 8 a handle 17 is arranged which by means of a skirt 18 embraces a collar 19 on the housing element 8 and at the lower edge the skirt 18 engages the housing element 8 by means of a groove-bead connection 20 in such a way that the handle 17 may be pushed inwardly upon the collar 19 in order to by snap action engage the groove-bead connection 20 in such a way that the handle 17 may rotate.

The handle 17 and the housing element 8 form a cavity 21 for accomodating a gear transmission. The gear transmission comprises a gear wheel 22 centrally secured to the inner surface of the handle 17, and which projects into the cavity 21. The gear wheel 22 engages a gear wheel sector 24 as it clearly appears from FIG. 3. The axis of rotation of the gear sector 24 is in FIG. 3 provided with reference 25, and this axis coincides with the axis of rotation 6 of the valve plug. In FIG. 3 the axis of the gear wheel 22 is provided with the reference numeral 26, and this axis extends as it appears from the above explanation coaxially with the axis of rotation of the handle 17. From FIG. 3 it will be seen that the axis 26 of the gear wheel 22 and the axis of rotation 25 of the gear wheel sector are displaced parallel with respect to each other. At its axis of rotation 25 the gear wheel sector 24 is provided with a pin 28, FIG. 4, secured in the sector and having the same cross section as the hole previously referred to in the end of the stem 5, and which engages with this hole. According to the embodiment here illustrated the pin 28 is angular and is partly moulded into the bottom of the gear wheel sector 24.

According to the embodiment illustrated and as it appears from FIG. 3, the gear wheel sector 24 is accomodated in a recess 29 in the housing element 8. The recess is enclosed by a circle arc shaped wall 30 and a wall portion 31 which extends as a chord to the circle arc shaped wall 30, and which extends perpendicular to the connecting line between the axes 26 and 25. The gear wheel sector is delimited by two rectilinear edge parts 32 and 33 extending perpendicular to each other, and these edge parts are mutually connected by means of circle arc formed edge parts 34 and 35. The curvature of the circle arc shaped edge part 34 corresponds to the curvature of the inner surface of the wall part 30 and the radius of curvature of the arc shaped edge part 35 corresponds to the distance between the wall part 31 and the axis 25.

A curved hole or groove 36 is provided in the gear wheel sector 24 and serves to accomodate the gear wheel 22 of the handle 17. The curved groove or hole extends along a length of arc of approximately 90° and is at the ends terminated by half circular walls, the diameters of which are a little greater than the diameter of the gear wheel 22. The outer side of the curved groove or hole is provided with an internal toothing 37 with which the gear wheel 22 engages. It will be understood that the teeth 37 are arranged along a circular arc of approximately 90°, and it will be understood that a rotation of the gear wheel 22 clockwise in FIG. 3 one revolution will result in a pivoting of the gear wheel sector 24 of 90° which exactly corresponds to a movement of the valve plug 3 from open position to closed position. Due to the fact that the teeth 37 face inwardly towards the axis of rotation 25 of the gear wheel sector, the handle 17 and the valve plug 3 will obtain one and the same direction of rotation. In order to mark the position of the passage 4 with respect to the valve housing 1, the housing element 8 is provided with an arrow 40 as it appears from FIG. 1, and the skirt 18 is along the lower edge provided with a graduation 41, upon which the position of the axis of the passage 3 may be read.

As it appears from FIG. 3, the edge part 32 of the sector 24 abuts against the wall part 31 in the open position illustrated in said figure. Moreover, it will be understood that after a rotation of the sector 24 of 90°, the other edge part 33 of the sector 24 will abut against the wall part 31, which accordingly constitutes end stops for the rotation. Furthermore, the sector 24 is securely guided with respect to the housing element 8 due to the circle arc shaped wall 30, the wall part 31 and the contour of the sector 24 explained above and consisting of the edge parts 32 and 33 and the circle arc shaped edge parts 34 and 35. According to the embodiment illustrated on the drawing, also the half circular ends of the curved groove or hole 36 will form end stops by cooperation with the gear wheel 22, and it will be understood that according to other embodiments either the one or the other form of end stops may be used. Furthermore, it will be understood that the curved groove or hole 36 adds to the guiding of the sector 24, due to the fact that the width of this groove or hole corresponds to the diameter of the gear wheel 22, of course with an appropriate clearance.

According to the embodiment explained the gearing ratio between the teeth 37 and the gear wheel 22 is selected 1:4, and the gear wheel 22 is toothed along the full circumference. However, nothing prevents to distribute the teeth of the gear wheel 22 along a smaller part of the circumference of the gear wheel 22, which in such case must be made greater than shown on the drawing, if a smaller gearing ratio is required.

It will be realized that even if a small moment of force is applied to the handle 17 a great force will be applied upon the gear wheel 22 due to the diameter difference between the skirt 18 and the gear wheel 22 and such force will be transferred to the gear wheel sector 24 at a comparatively great distance from the axis of rotation 25 of the sector which also has the effect that a great moment of force is applied to the spherical plug 3.

According to the embodiment illustrated on the drawing an internal toothing of the gear wheel sector 24 is used. However, the gear wheel sector 24 may be provided with an external toothing, but if this is the case the valve plug 3 will rotate opposite to the direction of rotation of the handle 17, and moreover the moment of force, which the sector 24 applies to the plug 3, will be reduced under otherwise even conditions. However, a compensation for this reduction may be achieved by designing the construction in such a way that the distance between the two axes 25 and 26 is increased.

We claim:
1. A fluid flow-control valve which comprises
a valve housing having a fluid flow passageway therethrough, said passageway defining a central axis,
a rotatable plug movably positioned in said fluid flow passageway to control the flow of fluid therethrough, said plug including a stem which is rotatable around a first axis line that is perpendicular to said central axis, and
a control device for controlling the movement of said plug within said passageway, said control device comprising
a housing element which is snap attached to said valve housing, said housing element providing a recess therein, said first axis line extending through said recess and said recess being defined by a curved wall and a wall portion, said curved wall representing an arc of a circle whose center is along said first axis line and said wall portion extending as a chord to said curved wall,
a handle which is rotatably mounted to said housing element, said handle including a central gear wheel which extends into said recess and rotates about a second axis line, said second axis line being parallel to said first axis line, and
a gear wheel sector located in said recess and connected to said stem, said gear wheel sector being rotatable about said first axis line, said gear wheel sector including an arcuate groove in which said gear wheel is positioned and including teeth extending inwardly of said arcuate groove to engage with said gear wheel.

2. The fluid flow-control valve as defined in claim 1, wherein said valve housing has an hexagonal cross section defining six outer surfaces, wherein said housing element includes a cylindrical main portion which extends away from said valve housing and in which said recess is located and two ears which extend away from said cylindrical main portion and towards said valve housing, said ears and said cylindrical main portion providing internal surfaces which are abuttable against three of the six outer surfaces of said valve housing, and wherein said ears include inwardly-directed projections for snap clamping said housing element onto said valve housing.

3. A fluid flow-control valve which comprises
a valve housing having a fluid flow passageway therethrough, said passageway defining a central axis,
a rotatable plug movably positioned in said fluid flow passageway to control the flow of fluid therethrough, said plug including a stem which is rotatable around a first axis line that is perpendicular to said central axis, and
a control device for controlling the movement of said plug within said passageway, said control device comprising
a housing element which is non-rotatably attached to said valve housing, said housing element providing a recess therein, said first axis line extending through said recess and said recess being defined by a curved wall and a wall portion, said curved wall representing an arc of a circle whose center is along said first axis line and said wall portion extending as a chord to said curved wall, a handle which is rotatably mounted to said housing element, said handle including a central gear wheel which extends into said recess and rotates about a second axis line, said second axis line being parallel to said first axis line, a gear wheel sector located in said recess, said gear wheel sector being rotatable about said first axis line, said gear wheel sector including an arcuate groove in which said gear wheel is positioned and including teeth extending inwardly of said arcuate groove to engage with said gear wheel, and an angular pin connected between said gear wheel sector and said stem to cause said stem to rotate, said angular pin being located in said recess.

4. A fluid flow-control valve which comprises a valve housing having a fluid flow passageway therethrough, said passageway defining a central axis, a rotatable plug movably positioned in said fluid flow passageway to control the flow of fluid therethrough, said plug including a stem which is rotatable around a first axial line that is perpendicular to said central axis, and a control device for controlling the movement of said plug within said passageway, said control device comprising a housing element which is non-rotatably attached to said valve housing, said housing element including a cylindrical main portion in which a recess is located and an inwardly extending annular groove in its outer surface, said first axis line extending through said recess, and said recess being defined by a curved wall and a wall portion, said curved wall representing an arc of a circle whose center is along said first axis line and said wall portion extending as a chord to said curved wall, a handle which is rotatably mounted to said housing element, said handle including a generally cup-shaped outer part and a central gear wheel which extends inwardly of said cup-shaped outer part and into said recess and rotates about a second axis line, said second axis line being parallel to said first axis line, said generally cup-shaped outer part including a skirt having an inwardly-extending annular bead which fits within the annular groove in said cylindrical main portion to enable said handle to rotate relative to said housing element, and a gear wheel sector located in said recess and connected to said stem, said gear wheel sector being rotatable about said first axis line, said gear wheel sector including an arcuate groove in which said gear wheel is positioned and including teeth extending inwardly of said arcuate groove to engage with said gear wheel.

5. A fluid flow-control valve which comprises a valve housing having a fluid flow passageway therethrough, said passageway defining a central axis, a rotatable plug movably positioned in said fluid flow passageway to control the flow of fluid therethrough, said plug including a stem which is rotatable around a first axis line that is perpendicular to said central axis, and a control device for controlling the movement of said plug within said passageway, said control device comprising a housing element which is non-rotatably attached to said valve housing, said housing element providing a recess therein, said first axis line extending through said recess and said recess being defined by a curved wall and a wall portion, said curved wall representing an arc of a circle whose center is along said first axis line and said wall portion extending as a chord to said curved wall, a handle which is rotatably mounted to said housing element, said handle including a central gear wheel which extends into said recess and rotates about a second axis line, said second axis line being parallel to said first axis line, said wall portion extending generally perpendicular to an imaginary line extending through said first axis line and said second axis line, and a gear wheel sector located in said recess and connected to said stem, said gear wheel sector being rotatable about said first axis line, said gear wheel sector including an arcuate groove in which said gear wheel is positioned and including teeth extending inwardly of said arcuate groove to engage with said gear wheel, said arcuate groove extending over an arc of about 90° and defining ends which are generally semicircular, said gear wheel sector including two straight sides which are generally perpendicular to each other, first and second curved sides which connect the associated ends of said two straight sides and which represent arcs of circles whose centers are along said first axis line, said first curved side having a curvature corresponding to the curvature of said circle arc-shaped wall and said second curved side having a radius of curvature corresponding to the distance, said wall portion is spaced from said first axis line.

6. A fluid flow-control valve as defined in claim 5, wherein said gear wheel has teeth around its full circumference, and wherein the number of teeth on said gear wheel is generally equal to the number of teeth on said gear wheel sector.

* * * * *